United States Patent
Gatto

(10) Patent No.: US 10,839,726 B2
(45) Date of Patent: Nov. 17, 2020

(54) TAG FOR A CONSUMER PRODUCT

(71) Applicant: Alfay Designs, Inc.

(72) Inventor: Daniel Gatto, Brooklyn, NY (US)

(73) Assignee: AFJ Industries, LLC, Rahway, NJ (US)

( * ) Notice: Subject to any disclaimer, the term of this patent is extended or adjusted under 35 U.S.C. 154(b) by 27 days.

(21) Appl. No.: 15/455,341

(22) Filed: Mar. 10, 2017

(65) Prior Publication Data

US 2018/0261138 A1  Sep. 13, 2018

(51) Int. Cl.
*G09F 23/00* (2006.01)
*G09F 3/04* (2006.01)
*A47J 27/21* (2006.01)
*G09F 3/02* (2006.01)

(52) U.S. Cl.
CPC ............ *G09F 23/00* (2013.01); *G09F 3/04* (2013.01); *A47J 27/21166* (2013.01); *G09F 2003/0272* (2013.01); *G09F 2023/0025* (2013.01)

(58) Field of Classification Search
CPC . G09F 23/0058; A47J 27/21166; B65D 71/16
USPC ....... 40/306, 310, 324, 673, 913; 220/573.1; 229/89, 103.2, 118; 206/223; D09/711; 126/373.1
See application file for complete search history.

(56) References Cited

U.S. PATENT DOCUMENTS

| | | | |
|---|---|---|---|
| 4,407,414 A * | 10/1983 | Rey | B65D 85/54 206/516 |
| 4,539,767 A * | 9/1985 | Jaffe | F16L 1/11 40/316 |
| 5,957,038 A * | 9/1999 | Shimazaki | A47J 36/08 210/464 |
| 6,793,071 B2 * | 9/2004 | Rhyne | B65D 71/46 206/223 |
| 7,073,282 B2 * | 7/2006 | Savagian | G09F 3/0295 24/129 B |
| 8,458,940 B2 * | 6/2013 | Davidson | G09F 3/04 2/145 |
| 2015/0083711 A1 * | 3/2015 | Moon | A47J 27/002 219/621 |

* cited by examiner

*Primary Examiner* — Joanne Silbermann
(74) *Attorney, Agent, or Firm* — Fay Kaplun & Marcin, LLP

(57) ABSTRACT

A tag for a consumer product is securely placed on the consumer product. The system including the tag and consumer product includes a container having a bottom surface, a handle, and a spout. The system also includes a tag including a first part and a second part, the first part configured to be attached to the bottom surface, the second part including a first end coupled to the first part and a second free end, the second free end of the second part including a handle hole configured to receive the handle.

9 Claims, 10 Drawing Sheets

TAG FOR A CONSUMER PRODUCT

BACKGROUND INFORMATION

A kettle, a different liquid container, or other consumer product may be available for purchase to a consumer in a retail store. The kettle may be placed in a packaging for display on a shelf of the retail store. Specifically, the packaging may be a box that entirely houses the kettle while various images and/or labels are placed on an exterior of the box to illustrate the kettle as well as features associated with the kettle. The packaging may also house leaflets, an instruction manual, etc. of the kettle. The packaging may include features such as transparent portions, windows, or removed sections for the consumer to see or touch the kettle inside the packaging.

Despite the features of the packaging, a common practice of the consumer when considering to purchase the kettle is to open the packaging and remove the kettle from the packaging. In this manner, the consumer may see and touch the kettle to more fully consider a purchase. However, a consequence of removing the kettle from the packaging is that the consumer does not always place the kettle back into the packaging. Thus, the kettle may be separated from the packaging with no identifying feature that allows a subsequent consumer to connect the kettle with the corresponding packaging.

So that the product may be seen and touched by a consumer, the packaging may be replaced with a hangtag. That is, a tag that hangs off the product may be used in lieu of a box packaging. However, the hangtag is often small with a limited area to include information such as a branding, features, lifestyle images, etc. Furthermore, the hangtag has a tendency to simply fall off the product or get lost.

SUMMARY

The exemplary embodiments are directed to a system comprising: a container including a bottom surface, a handle, and a spout; and a tag including a first part and a second part, the first part configured to be attached to the bottom surface, the second part including a first end coupled to the first part and a second free end, the second free end of the second part including a handle hole configured to receive the handle.

The exemplary embodiments are directed to a tag comprising: a first part configured to be attached to a bottom surface of a kettle; and a second part including a first end coupled to the first part and a second free end, the second free end of the second part including a handle hole configured to receive a handle of the kettle.

The exemplary embodiments are directed to a system comprising: a container including a vessel, a bottom surface, a first extension extending from a first location of the vessel, and a second extension extending from a second location of the vessel, the first extension being a first distance from the bottom surface, the second extension being a second distance from the bottom surface; and a tag including a first part and a second part, the first part configured to be attached to the bottom surface, the second part including a first end coupled to the first part and a second free end, the second free end of the second part including a first hole configured to receive the first extension, the second part having a length based on the first distance.

DETAILED DESCRIPTION

Figure 1:
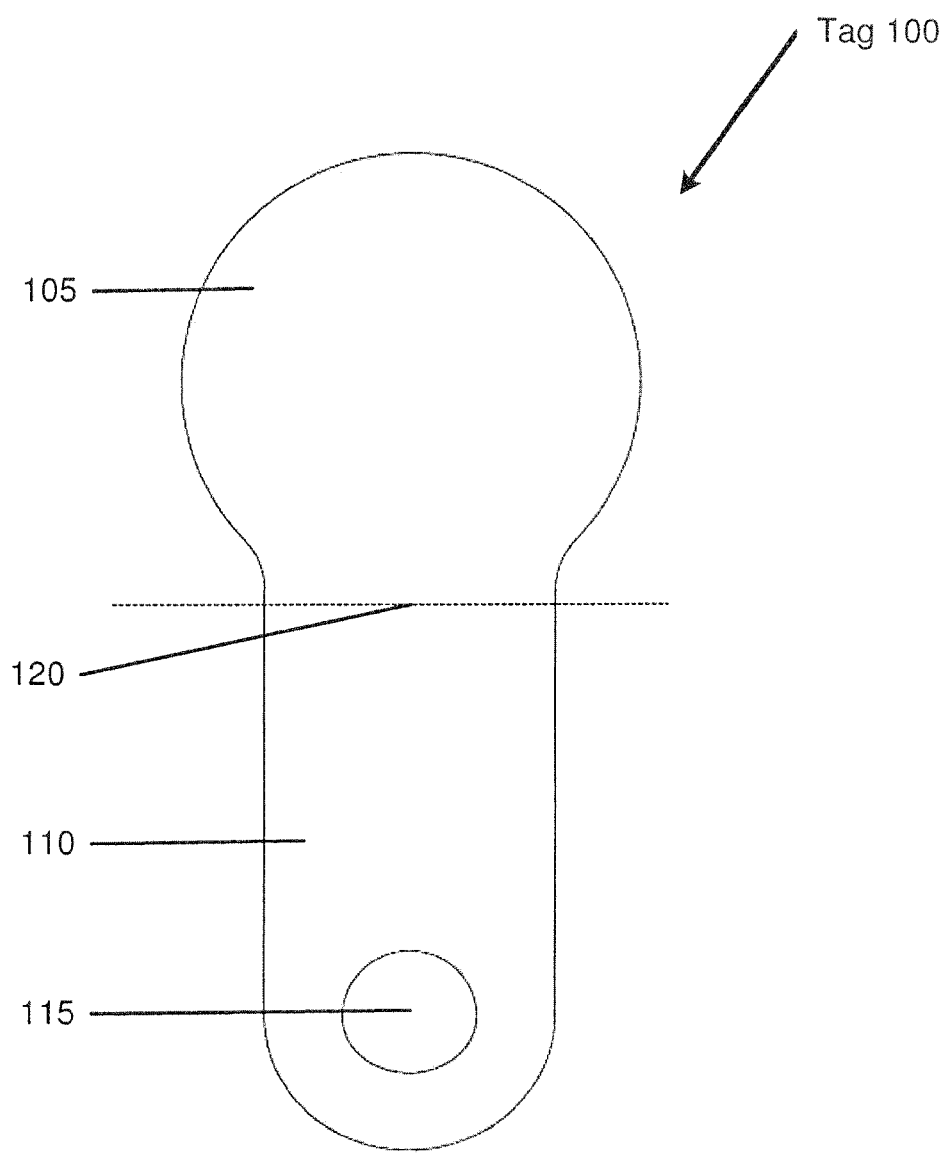
FIG. 1 shows a top view of a first tag according to the exemplary embodiments.

The exemplary embodiments may be further understood with reference to the following description and the related appended drawings, wherein like elements are provided with the same reference numerals. The exemplary embodiments are related to a tag for a kettle to be placed on display in a retail store. The tag may be placed on the kettle in a secured manner to ensure that the tag cannot be easily removed from the kettle. In a first exemplary embodiment, the tag may be placed on the kettle using the handle of the kettle. In a second exemplary embodiment, the tag may be placed on the kettle using the handle and the spout of the kettle.

The exemplary embodiments are described with regard to the tag being used for a kettle. However, it is noted that the use of the kettle is only exemplary. The tag according to the exemplary embodiments may be used for any item having comparable components of the kettle for which the features of the tag may be utilized. For example, the tag may be used with any item including a spout and a handle. In another example, the tag may be used with any item including a first component that cooperates with a first portion of the tag and a second component that cooperates with a second portion of the tag.

It is noted that the tag may be used independently of any packaging for the kettle. For example, the tag may include the information (e.g., label, manufacturer, etc.) that would ordinarily be placed on the packaging or on leaflets/booklets placed inside the packaging. Accordingly, the tag according to the exemplary embodiments may eliminate the need for using a packaging with the kettle. That is, the tag according to the exemplary embodiments may decrease materials needed to distribute the kettle to retail outlets. To transport the kettles with the tags, a large container that holds a plurality of the kettles or eggshell crates that cradle the kettles may be used. The tags also eliminate the need for elaborate boxes that include color printing, cutouts, etc.

Figure 2:
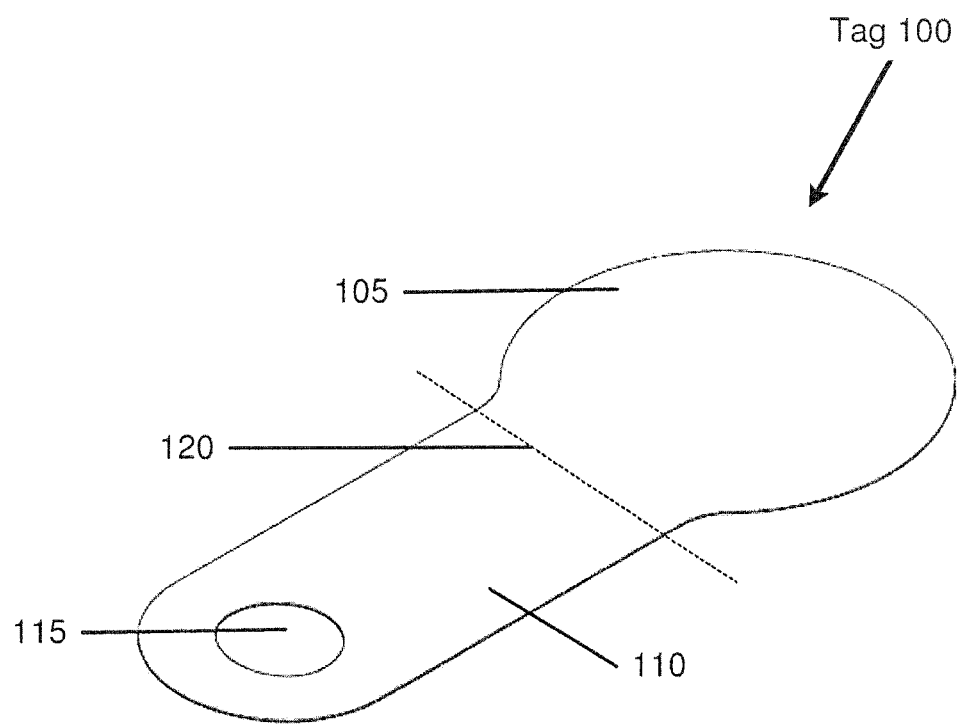
FIG. 2 shows a perspective view of the first tag of FIG. 1 according to the exemplary embodiments.

FIGS. 1-2 show various views of a first tag 100 according to the exemplary embodiments. Specifically, FIG. 1 shows a top view while FIG. 2 shows a perspective view of the first tag 100. The first tag 100 may be a first exemplary embodiment of a tag that is used with a kettle. Specifically, the first tag 100 may be secured to the kettle using a handle of the kettle. The first tag 100 may be any material such as paper, cardboard, plastic, etc. Specifically, the material for the first tag 100 may enable a fold to be made, may be shaped for a fold to be used, and/or may allow for the first tag 100 to be curved. The material for the first tag 100 may also allow for an adhesive or locking/coupling component to be applied for attachment to a surface of an item such as the kettle. The first tag 100 may be manufactured as a single piece or as multiple pieces coupled together. The tag first 100 may include a first part 105, a second part 110, a handle hole 115, and a fold line 120.

The first part 105 may be a first side of the first tag 100. As illustrated, the first part 105 may be substantially circular. Specifically, the first part 105 may be shaped to coincide with a shape of a bottom surface of the kettle as the first part 105 is configured to be placed adjacent to the bottom surface of the kettle. However, it is noted that the first part 105 having a similar shape to the bottom surface of the kettle is only exemplary. For example, the first part 105 may be substantially rectangular and still be placed adjacent to a circular bottom surface of the kettle. The first part 105 may be sized to be either less than or at most an area of the bottom surface of the kettle. However, this size is only exemplary and the first part 105 may have a size that is greater than the area of the bottom surface of the kettle. The side of the first part 105 that faces the bottom surface of the kettle may have an adhesive applied thereto or include a coupling component that allows the first part 105 to attach to the bottom surface of the kettle. The side of the first part 105 that faces away from the bottom surface of the kettle may include a label, an image, a universal product code (UPC), etc.

The second part 110 may be a second side of the first tag 100. Specifically, the second part 100 may extend from the first part 105 where a first end is coupled to the first part 105 and extends to a second free end. As illustrated, the second part 110 may be substantially rectangular with a rounded end. However, it is noted that the second part 110 having a substantially rectangular shape and a rounded end is only exemplary. In another exemplary embodiment, the second part 110 may extend from the first part 105 with any shape, with or without a rounded end. In a further exemplary embodiment, the second part 110 may include a substantially rectangular extension with a substantially circular end (including the handle hole 115) where the diameter of the circular end is greater than a width of the rectangular extension. The length of the second part 110 may depend upon the arrangement of the kettle. Specifically, the distance between the handle of the kettle to the bottom surface of the kettle may determine a minimum length of the second part 110. As will be described in detail below, the second part 110 extends from the first part 105 at least the distance between the handle and the bottom surface of the kettle. The second part 110 may also extend beyond the handle of the kettle. The second part 110 may be capable of curving upward from the extension point with the first part 105 or the fold line 120. Similar to the first part 105, the side of the second part 110 that faces away from the kettle may include a label, an image, etc.

The second part 110 may include the handle hole 115. The handle hole 115 may be located at any position within the second part 110 but at least a minimum distance from where the second part 110 extends from the first part 105. Specifically, the minimum distance of the handle hole 115 on the second part 110 may be based on the arrangement of the kettle, in particular, where the handle is located relative to the bottom surface of the kettle. Thus, the minimum distance that the handle hole 115 is located on the second part 110 may correspond to the distance from which the handle is separated from the bottom surface of the kettle. In a particular exemplary embodiment and as illustrated in FIGS. 1-2, the handle hole 115 may be included in the second free end of the second part 110. It is noted that the handle hole 115 may be located at a position whose distance is greater than the minimum distance. As will become apparent below, when the handle hole 115 is located at a position whose distance is greater than the minimum distance, the second part 110, when attached to a kettle, may bend or curve more than when the handle hole 115 is located at the minimum distance.

The handle hole 115 is also illustrated as an intact hole. That is, the second part 110 does not have any cuts from the handle hole 115 to an edge of the second part 110. However, the use of an intact hole for the handle hole 115 is only exemplary. In another exemplary embodiment, the second part 110 may include a cut (or slit) for the handle hole 115. Furthermore, depending on the material used to manufacture the tag 100 (specifically the second part 110), a size and shape of the handle hole 115 may remain fixed or may change. Initially, the handle hole 115 may have a size and shape corresponding to a cross-sectional area of the handle of the kettle (e.g., a largest cross-sectional area of the handle if the handle changes size along its length). When the material of the second part 110 is rigid (e.g., cardboard), the handle hole 115 may be fixed in the above noted size and shape. However, when the material of the second part 110 is more flexible (e.g., rubber, plastic, etc.), the size and shape of the handle hole 115 may be changed as needed. With an elastic material, the handle hole 115 may return to the above noted size and shape which represents an unstressed condition.

The second part 110 may also include the fold line 120. The fold line 120 may be a line where the second part 110 is folded upward toward the handle of the kettle. Therefore, the fold line 120 allows for a corner to be created on the second part 110. Thereafter, as described above, the second part 110 may curve upward toward the handle of the kettle. It is noted that the use of the fold line 120 is only exemplary. In another exemplary embodiment, the tag 100 may be used without the fold line 120. In this exemplary embodiment, the second part 110 may curve upward toward the handle of the kettle from the extension point with the first part 105.

It is also noted that the position of the fold line 120 as illustrated in FIGS. 1-2 is only exemplary. The fold line 120 may be positioned at any location on the second part 110. In a first example, the fold line 120 may be closer to the extension point of the second part 110 with the first part 105. In a specific example of this, the fold line 120 may be at the extension point. In a second example, the fold line 120 may be further away from the extension point of the second part 110 with the first part 105. However, independent of where the fold line 120 is located on the second part 110, the length of the remaining portion of the second part 110 from the fold line 120 may be a minimum length for the handle hole 115 to reach the handle of the kettle.

It is further noted that the orientation of the fold line 120 as illustrated in FIGS. 1-2 of being perpendicular to a side of the second part 110 is only exemplary. In another exemplary embodiment, the fold line 120 may be at a non-zero, non-perpendicular angle to the side of the second part 110 (e.g., between 0 and 90 degrees).

Figure 3:
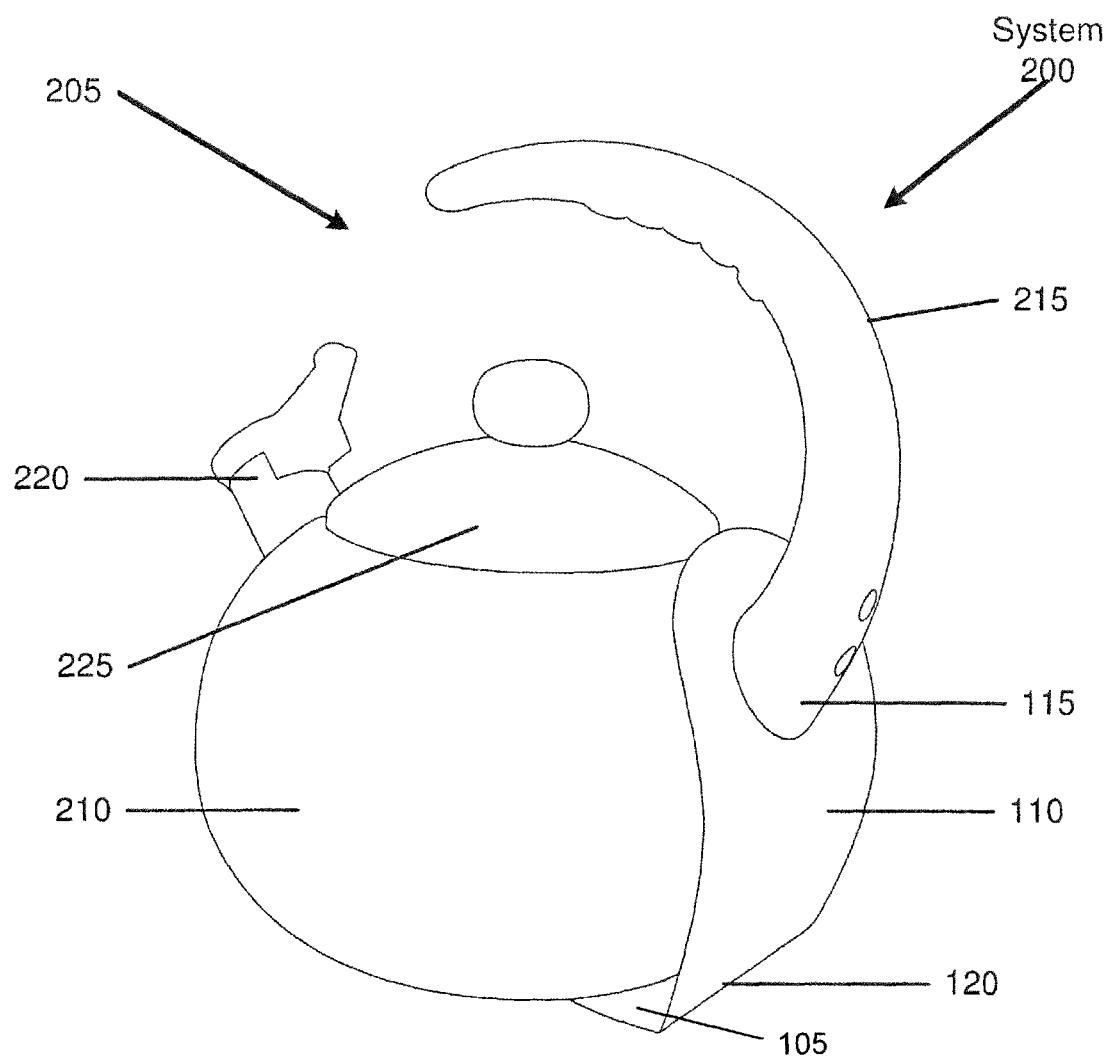
FIG. 3 shows a top, handle-side view of a first system including the first tag of FIG. 1 according to the exemplary embodiments.
Figure 4:
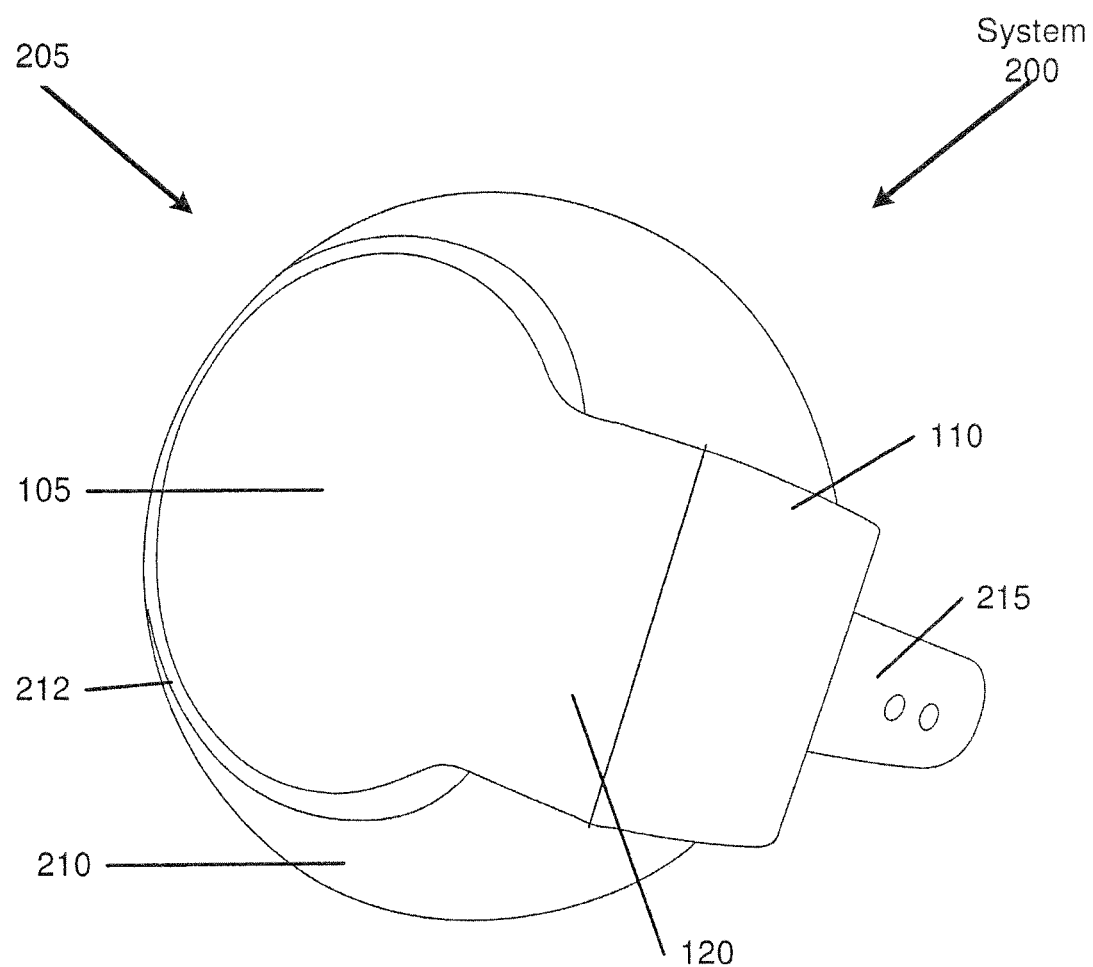
FIG. 4 shows a bottom, handle-side view of the first system of FIG. 3 according to the exemplary embodiments.

FIGS. 3-4 show various views of a first system 200 including the first tag 100 utilized with a kettle 205. Specifically, FIG. 3 shows a top, handle-side view of the first system 200 while FIG. 4 shows a bottom, handle-side view of the first system 200. The first system 200 illustrates a manner in which the first tag 100 may be attached to the kettle 205. The kettle 205 may include a vessel 210 that holds a liquid and having a bottom surface 212, a handle 215, a spout 220, and a lid 225.

The first system 200 illustrated in FIGS. 3-4 relates to when the first part 105 corresponds to the shape and size of the bottom surface 212 of the kettle 205. The first system 200 also relates to when the fold line 120 is a minimal distance from the extension point of the second part 110 with the first part 105 where the minimal distance allows for the second part 110 to be folded upward at a right angle without interference from the vessel 210. The first system 200 further relates to when the handle hole 115 is a minimum distance corresponding to the distance of the handle 215 from the bottom surface 212 of the kettle 205. Lastly, the first system 200 relates to when the handle hole 115 is intact and has a fixed size and shape corresponding to a cross-sectional area of the handle 215.

With the type of first tag 100 as described above, the first tag 100 may be attached to the kettle 205 via the handle 115 and the bottom surface 212. In an exemplary manner of attaching the first tag 100 to the kettle 205, the first tag 100 may initially be attached to the handle 215 via the handle hole 115. Thus, the handle hole 115 may receive the handle 215 from a free end of the handle 215. The first tag 100 may then be moved along the handle 215 toward a connection point of the handle 215 to the vessel 210.

The first tag 100 may then be folded along the fold line 120. Specifically, the first tag 100 may be folded such that the first part 105 is brought adjacent to the bottom surface 212. In a particular embodiment, the first part 105 may be perpendicular to the second part 110. As illustrated in the first system 200, the fold line 120 is a distance away from the extension point of the second part 110 with the first part 105. Thus, there is a portion of the second part 110 also adjacent the bottom surface 212.

The first part 105 may subsequently be attached to the bottom surface 212. In a first exemplary embodiment, an adhesive may be used to attach the first part 105 to the bottom surface 212. For example, a glue may be applied to a side of the first part 105 facing the bottom surface 212. In another example, an adhesive tape may be used to couple the first part 105 to the bottom surface 212. The adhesive may be configured to enable the attaching of the first part 105 but also allow for easy removal by a purchasing consumer (e.g., a putty, a gum, etc.). In a second exemplary embodiment, the bottom surface 212 may have a threaded hole and the first part 105 may have a hole that corresponds in position to the threaded hole when the first part 105 is in a proper position. A screw or locking component may be utilized to couple the first part 105 to the bottom surface 212.

Using the above manner of attaching the first tag 100 to the kettle 205, a secure attachment may be provided until the first tag 100 is purposefully removed from the kettle 205 (e.g., by a consumer after purchase). With the first tag 100 secured on the handle 215 (via the handle hole 115) and the bottom surface 212 (via attachment of the first part 105), a need to package the kettle 205 is eliminated. Information about the kettle 205 may be presented on the tag 100 for any consumer who wishes to consider the kettle 205 for purchase.

As noted above, the above manner of attaching the first tag 100 to the kettle 205 is when the components of the first tag 100 exhibit particular characteristics. When the components of the tag 100 are different, the manner of attaching the first tag 100 may be modified. In a first example, the first part 105 may not correspond to the shape and size of the bottom surface 212 of the kettle 205. Accordingly, when the first tag 100 is folded along the fold line 120, the first part 105 may be brought adjacent the bottom surface 212 to ensure that an attachment may be made. For example, if an adhesive is used, the first part 105 may be placed adjacent any part of the bottom surface 212. In another example, if a locking component is used, the first part 105 may be placed adjacent the bottom surface 212 where the locking component may be properly positioned.

In second and third examples, the fold line 120 may be more than a minimal distance from the extension point of the second part 110 with the first part 105 and/or the handle hole 115 may be more than a minimum distance corresponding to the distance of the handle 215 from the bottom surface 212 of the kettle 205. When the fold line 120 and/or the handle hole 115 is in such a position on the second part 110, after folding the tag 110, the first part 105 should be properly positioned adjacent the bottom surface 212. For example, when the first part 105 corresponds in shape and size to the bottom surface 212, the first part 105 should be moved to occupy a common area as the bottom surface 212.

In a fourth example, the handle hole 115 may not be intact and/or have a fixed size and shape corresponding to a cross-sectional area of the handle 215. If the handle hole 115 is not intact, the manner in which the first tag 100 is attached to the kettle 205 is not limited to first using the handle hole 115 prior to attaching the first part 105 to the bottom surface 212. For example, if there is a cut that allows the handle hole 115 to be opened, the first part 105 may first be attached to the bottom surface 212. Thereafter, the first tag 100 may be folded along the fold line 120 for the second part 110 to be brought upwards. The handle hole 115 may be opened for the handle 215 to be placed therein and subsequently closed around the handle 215. If the handle hole 115 has a changeable size/shape, the handle hole 115 may be stretched to accommodate the cross-sectional area of the handle 215.

It is noted that the first tag 100 including the handle hole 115 is only exemplary. Moreover, the use of the handle 215 for the first system 200 is only exemplary. The first tag 100 may be modified such that the first tag 100 may be attached to the kettle 205 using the spout 220. Therefore, the handle hole 115 may be replaced with a spout hole. As shown in the first system 200, the spout 220 may include a hinged top which affects an otherwise constant cross-sectional area. The spout hole may be configured to be placed over the hinged top and remain on the spout 220 in a substantially similar manner as the handle 215. The remaining manner of attaching the tag 100 with a spout hole may remain the same as the tag 100 with a handle hole 115.

Figure 5:
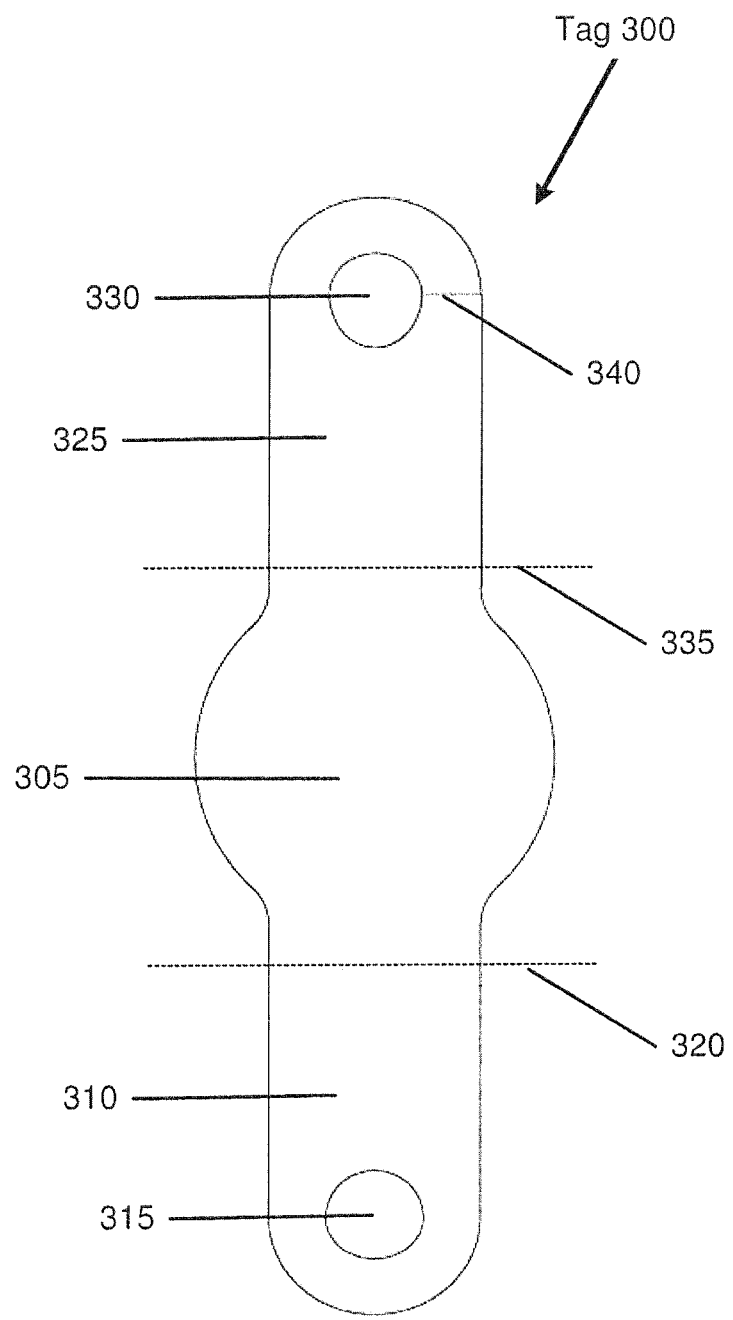
FIG. 5 shows a top view of a second tag according to the exemplary embodiments.
Figure 6:
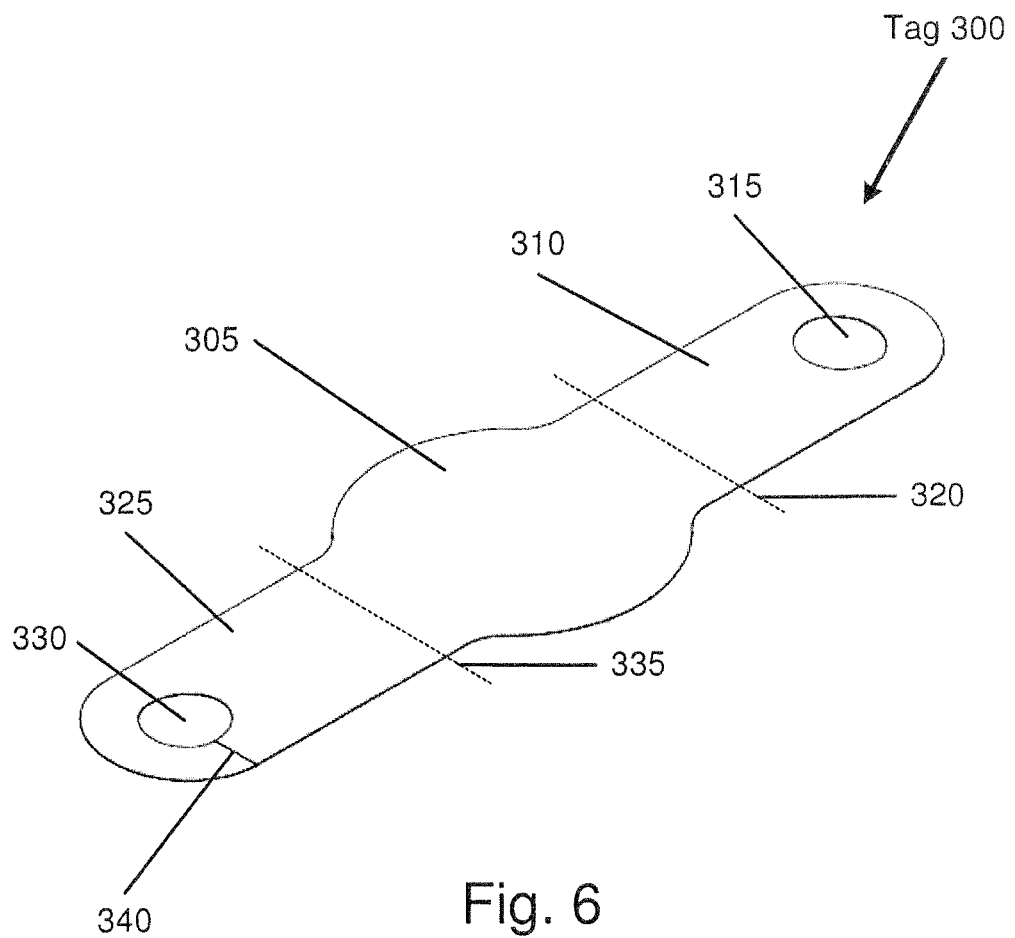
FIG. 6 shows a perspective view of the second tag of FIG. 1 according to the exemplary embodiments.

FIGS. 5-6 show various views of a second tag 300 according to the exemplary embodiments. Specifically, FIG. 5 shows a top view while FIG. 6 shows a perspective view of the second tag 300. The second tag 300 may be a second exemplary embodiment of a tag that is used with a kettle. As will be described in detail below, the kettle may be the same kettle 200 used with the first tag 100. The second tag 300 may be substantially similar to the first tag 100 in terms of the manufacture. In contrast to the first tag 100, the second tag 300 may be secured to the kettle using a handle and a spout of the kettle. The second tag 300 may include a first part 305, a second part 310, a handle hole 315, a first fold line 320, a third part 325, a spout hole 330, a second fold line 335, and a cut 340.

The first part 305, the second part 310, the handle hole 315, and the first fold line 320 of the second tag 300 may be substantially similar to the first part 105, the second part 110, the handle hole 115, and the fold line 120 of the first tag 100, respectively. All of the features and modifications of these components of the first tag 100 described in detail above may also be applied to the corresponding components of the second tag 300. However, it is noted that the first part 305 in the tag 300 differs from the first part 105 of the tag 100 in that the first part 305 is not an end of the tag 300 but a central component.

The third part 325, the spout hole 330, and the second fold line 335 may be substantially similar to the second part 310, the handle hole 315, and the first fold line 320. In contrast to the second part 310, the third part 325 may extend from an opposite side of the first part 305. For example, as illustrated, the second part 310 and the third part 325 may extend along a line including a diameter of the first part 305 (180 degrees apart from one another—on opposite sides of the first part 305). However, the relative positioning of the second part 310 to the third part 325 being linear is only exemplary. Such a relative positioning may be used when the handle and the spout of the kettle are in a similar linear orientation. Therefore, depending on the orientation of the handle and the spout of the kettle, the relative positioning of the second part 310 to the third part 325 may be modified accordingly. Similar to the second part 310, the third part 325 may also include a first end coupled to the first part 305 and a second free end. The spout hole 330 may be included in the second free end of the third part 325.

As described above, the handle hole 315 may include a cut. In a substantially similar manner, the spout hole 330 may include the cut 340. In contrast to the handle hole 315, the third part 325 may be required to include the cut 340 with the spout hole 330. As will be described in detail below, the cut 340 may enable the third part 325 to be secured to the spout of the kettle after the second part 310 has been secured to the handle of the kettle. Specifically, the cut 340 may enable the spout hole 330 to be opened to allow the spout of the kettle to be received in the spout hole 330. Thereafter, the spout hole 330 may be closed around the spout of the kettle.

Figure 7:
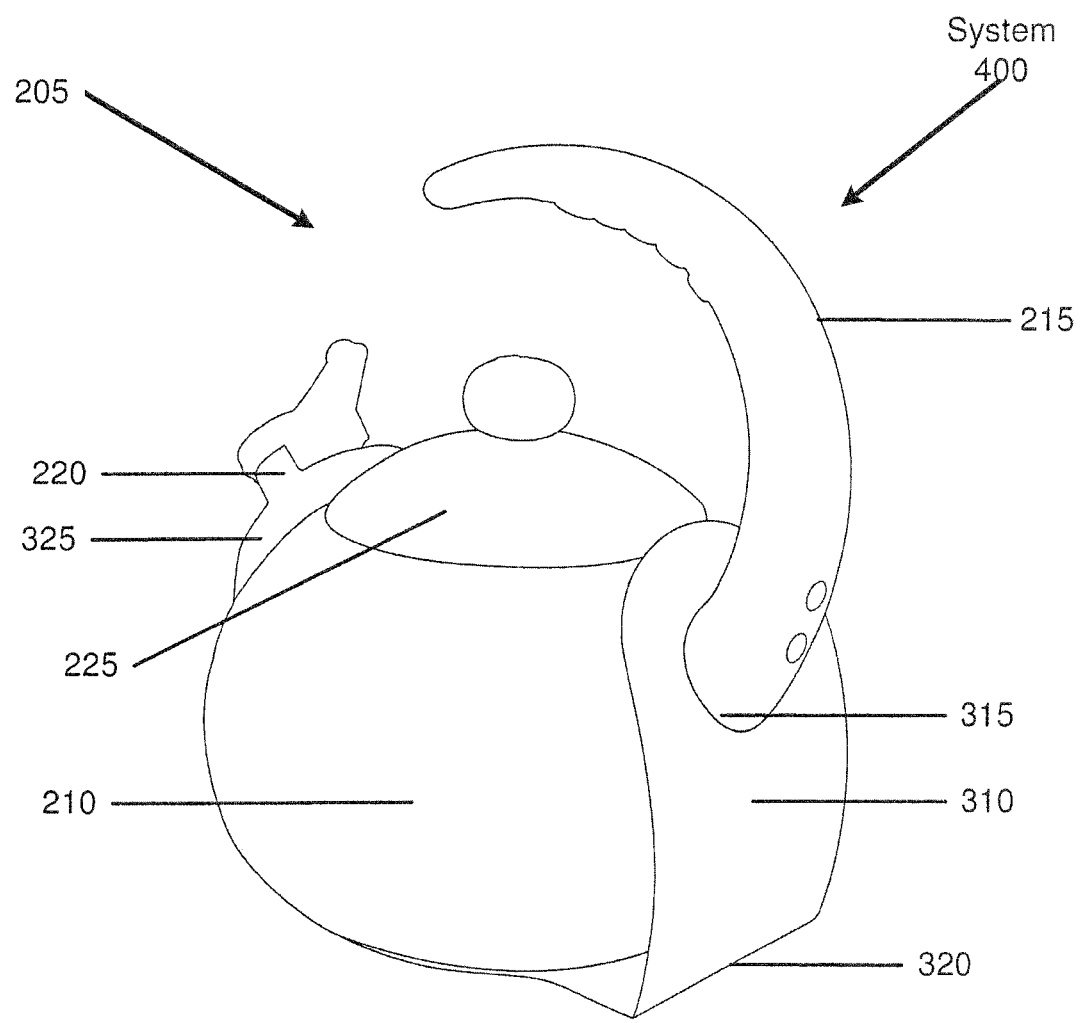
FIG. 7 shows a top, handle-side view of a second system including the second tag of FIG. 5 according to the exemplary embodiments.
Figure 8:
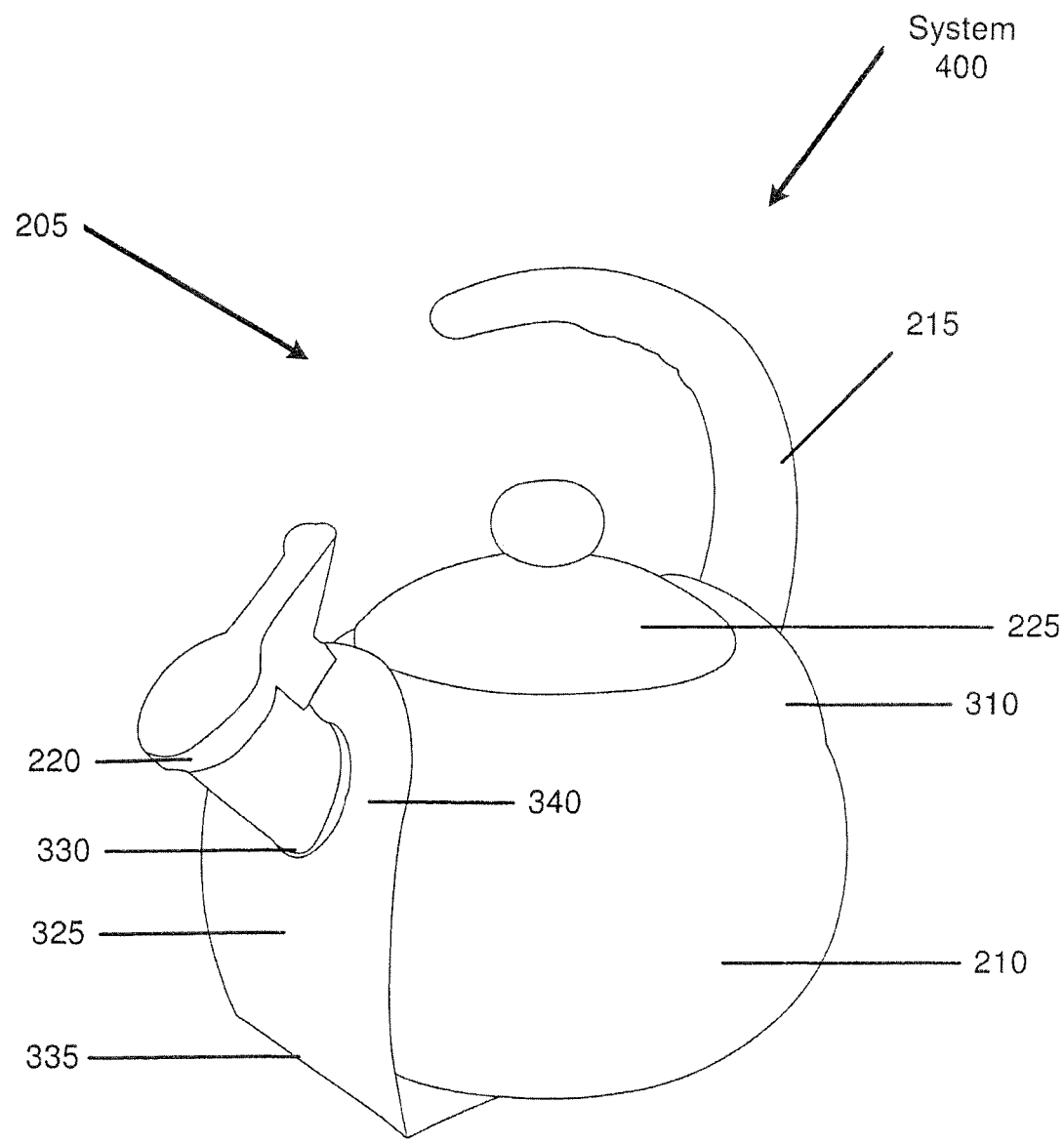
FIG. 8 shows a top, spout-side view of the second system of FIG. 7 according to the exemplary embodiments.
Figure 9:
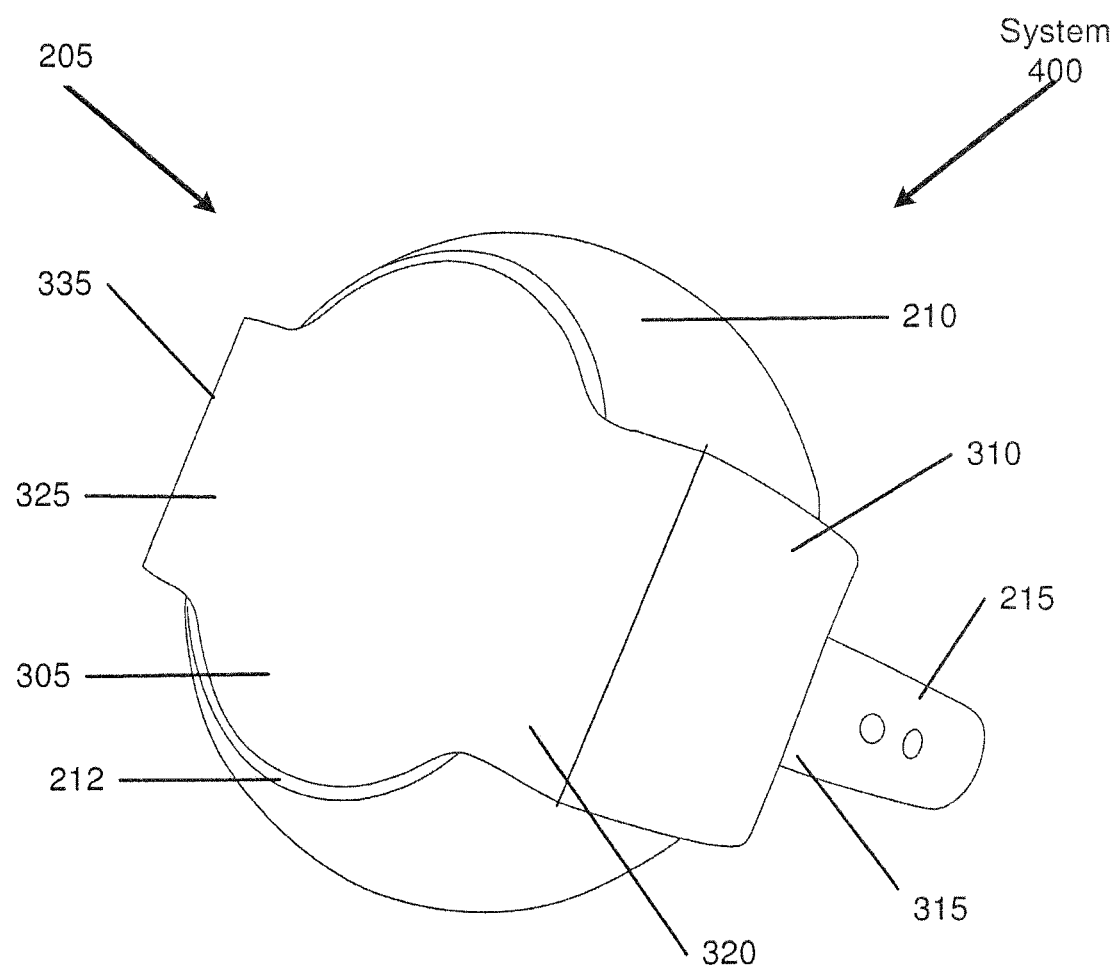
FIG. 9 shows a bottom, handle-side view of the second system of FIG. 7 according to the exemplary embodiments.
Figure 10:
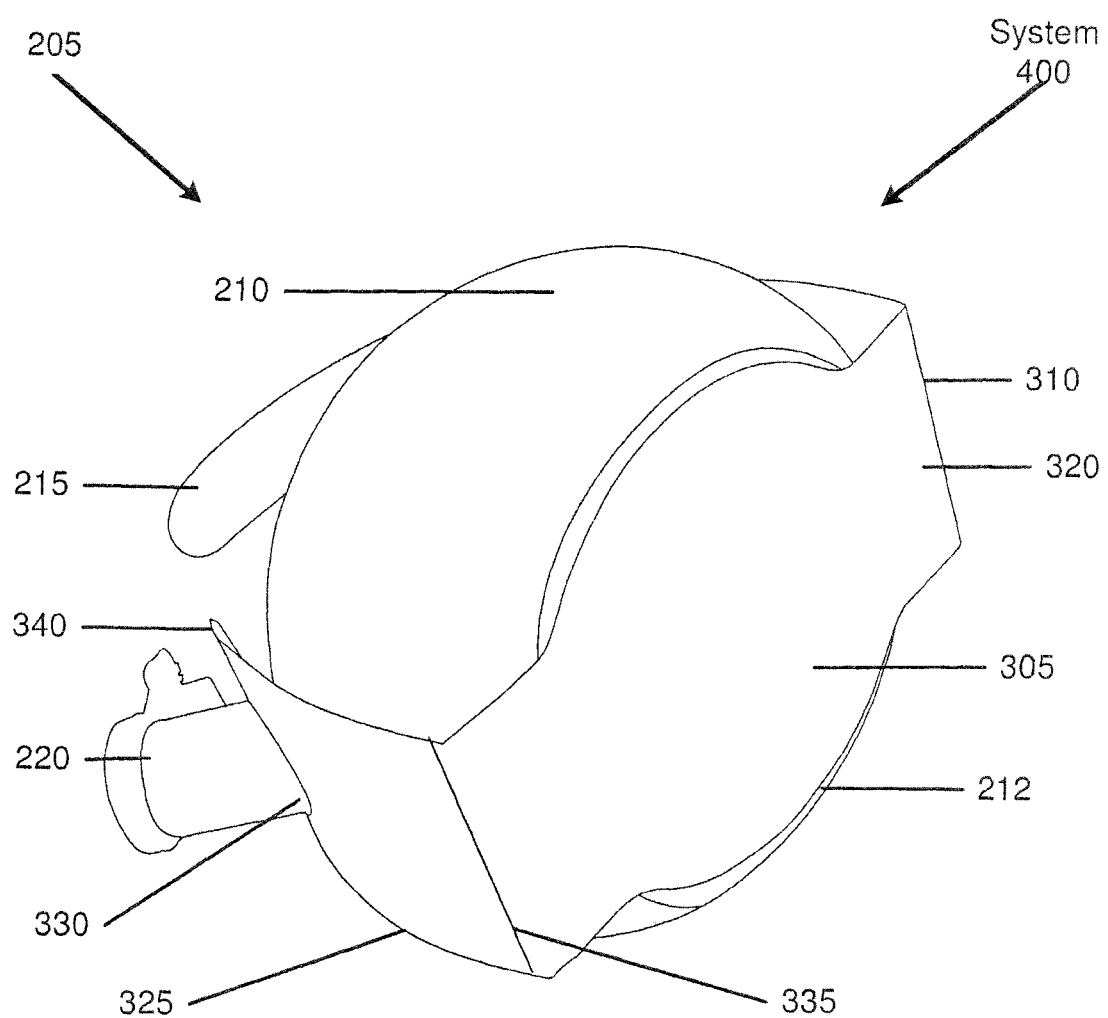
FIG. 10 shows a bottom, spout-side view of the second system of FIG. 7 according to the exemplary embodiments.

FIGS. 7-10 show various views of a second system 400 including the second tag 300 utilized with the kettle 205. Specifically, FIG. 7 shows a top, handle-side view of the second system 400, FIG. 8 shows a top, spout-side view of the second system 400, FIG. 9 shows a bottom, handle-side view of the second system 400, and FIG. 10 shows a bottom, spout-side view of the second system 400. As described above, the kettle 205 may include the vessel 210, the handle 215, the spout 220, and the lid 225. The second system 400 illustrates a manner in which the second tag 300 may be attached to the kettle 205.

Substantially similar to the first system 200, the second system 400 illustrated in FIGS. 7-10 relate to when the first part 305 corresponds to the shape and size of the bottom surface 212 of the kettle 205. The second system 400 also relates to when the first fold line 320 and the second fold hole 335 are a minimal distance from the extension point of the second part 310 with the first part 305 and the extension point of the third part 325 with the first part 305 where the minimal distance allows for the second part 310 to be folded upward at a right angle without interference from the vessel 210 and the third part 325 to be folded upward in a likewise manner. The second system 400 further relates to when the handle hole 315 and the spout hole 330 are a minimum distance corresponding to the distance of the handle 215 from the bottom surface 212 of the kettle 205 and the distance of the spout 220 from the bottom surface 212 of the kettle 205. Lastly, the second system 400 relates to when the handle hole 115 is intact and has a fixed size and shape corresponding to a cross-sectional area of the handle 215 while the spout hole 330 has a fixed size and shape corresponding to a cross-sectional area of the spout 220.

With the type of second tag 300 as described above, the second tag 300 may be attached to the kettle 205 via the handle 115 and the bottom surface 212. In an exemplary manner of attaching the second tag 300 to the kettle 205, the second tag 300 may initially be attached to the handle 215 via the handle hole 315. Thus, the handle hole 315 may receive the handle 215 from a free end of the handle 215. The second tag 300 may then be moved along the handle 215 toward a connection point of the handle 215 to the vessel 210.

The second tag 300 may then first be folded along the first fold line 320. Specifically, the second tag 300 may be folded such that the first part 305 is brought adjacent to the bottom surface 212. As illustrated in the second system 400, the first fold line 320 is a distance away from the extension point of the second part 310 with the first part 305. Thus, there is a portion of the second part 310 also adjacent the bottom surface 212.

The first part 305 may subsequently be attached to the bottom surface 212. The first part 305 may be attached to the bottom surface 212 in a substantially similar manner as the first 105 being attached to the bottom surface 212. For example, an adhesive or locking component may be used.

Once the first part 305 has been attached to the bottom surface 212, the second tag may then be folded along the second fold line 335. Specifically, the second tag 300 may be folded such that the third part 325 is brought upward (e.g., perpendicular to the first part 305). As illustrated in the second system 400, the second fold line 335 is a distance away from the extension point of the third part 325 with the first part 305. Thus, where is a portion of the second part 310 also adjacent the bottom surface 212. When the third part 325 has been folded upward along the second fold line 335, the spout 220 may be received in the spout hole 330. Specifically, the cut 340 may be used to open the spout hole 330 for the spout 220 to be received.

It is noted that the first part 305 being attached to the bottom surface 212 prior to the third part 325 being attached to the spout 220 is only exemplary. The tag 300 may also be attached in an opposite configuration in which the third part 325 is attached to the spout 220 prior to the first part 305 being attached to the bottom surface 212.

Using the above manner of attaching the second tag 300 to the kettle 205, a secure attachment may be provided until the second tag 300 is purposefully removed from the kettle 205 (e.g., by a consumer after purchase). With the second tag 300 secured on the handle 215 (via the handle hole 115), the bottom surface 212 (via attachment of the first part 105), and the spout 220 (via the spout hole 330), a need to package the kettle 205 is eliminated. Information of the kettle 205 may be presented on the second tag 300 for any consumer who wishes to consider the kettle 205 for purchase.

As noted above, the above manner of attaching the second tag 300 to the kettle 205 is when the components of the second tag 300 exhibit particular characteristics. When the components of the second tag 300 are different, the manner of attaching the second tag 300 may be modified. Examples of these modifications are described in detail above with regard to the first tag 100 (the modifications to the third part 325, the second fold line 335, and the spout hole 330 being substantially similar modifications to the second part 310, the handle hole 315, and the first fold line 320).

It is noted that the second part 110 of the first tag 100 including the handle hole 115, the second part 310 of the second tag 300 including the handle hole 315, and the third part 325 of the second tag 300 including the spout hole 330 are only exemplary. In other exemplary embodiments, the second part 110 may be attached to the handle 215 via other attachment mechanisms. The second part 310 may also be attached to the handle 215 via these other attachment mechanisms as well as the third part 325 being attached to the spout 220 via these other attachment mechanisms. For example, these other attachment mechanisms may include an adhesive, a mechanical locking component, a cooperative locking component where the kettle 200 includes a corresponding locking component, a twist tie, a tie wrap, etc.

The exemplary embodiments provide a tag that may be attached to an item such as a liquid container (e.g., a kettle). The tag may include a first part that attaches to a bottom surface of the item. The tag may include a second part that attaches to a first component of the item (e.g., a handle of the kettle). The tag may additionally include a third part that attaches to a second component of the item (e.g., a spout of the kettle). The tag may include label information, a UPC, features/benefits information, etc. for a consumer to review while directing seeing and touching the actual item being considered for purchase. In this manner, the item does not require any packaging to be used while relevant information being securely associated with the item.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A system, comprising:
a kettle, comprising a vessel, including a bottom surface, a side surface, a handle, a spout, and a lid, where the bottom surface is immovable with respect to the side surface and where the lid is removable from the kettle; and a tag including a first part and a second part, the first part configured to be attached to the bottom surface of the kettle, the second part including a first end coupled to the first part and a second free end, the second free end of the second part including a handle hole configured to receive the handle,
wherein the tag further includes a third part, the third part including a first end coupled to the first part and a second free end, the second free end of the third part including a spout hole configured to receive the spout.

2. The system of claim 1, wherein the first part is attached to the bottom surface using at least one of an adhesive and a locking component.

3. The system of claim 1, wherein the handle hole has a size and a shape corresponding to a largest cross-sectional area of the handle.

4. The system of claim 1, wherein the second part is perpendicular to the bottom surface, the second part including a fold line to fold the tag such that the first part is adjacent the bottom surface.

5. The system of claim 1, wherein the first part has a size and a shape corresponding to an area of the bottom surface.

6. The system of claim 1, wherein the spout hole has a size and a shape corresponding to a cross-sectional area of the spout.

7. The system of claim 1, wherein the third part is perpendicular to the bottom surface, the third part including a further fold line to fold the tag such that the first part is adjacent the bottom surface.

8. The system of claim 1, wherein the third part has a cut in communication with the spout hole, the cut configured to open the spout hole to an edge of the third part for the spout to be received in the spout hole.

9. The system of claim 1, wherein the second part and the third part are on opposite sides of the first part.

* * * * *